United States Patent [19]

Marfurt et al.

[11] 4,271,028

[45] Jun. 2, 1981

[54] PROCESS FOR PURIFYING EFFLUENTS CONTAINING PROTEINS

[75] Inventors: Hans-Rudolf Marfurt; August Zurrer, both of Marly, Switzerland

[73] Assignee: Ciba-Geigy Corporation, Ardsley, N.Y.

[21] Appl. No.: 99,233

[22] Filed: Nov. 30, 1979

Related U.S. Application Data

[63] Continuation of Ser. No. 12,673, Feb. 15, 1979, abandoned, which is a continuation of Ser. No. 808,763, Jun. 22, 1977, abandoned.

[30] Foreign Application Priority Data

Jul. 2, 1976 [CH] Switzerland .......................... 8504/76

[51] Int. Cl.³ ............................................... C02F 1/56
[52] U.S. Cl. ..................................... 210/727; 210/735; 210/748; 210/905; 204/149; 260/112 R
[58] Field of Search ....................... 210/45, 51, 52, 53, 210/54, 44; 204/149, 152; 260/112 R

[56] References Cited

U.S. PATENT DOCUMENTS

| | | | |
|---|---|---|---|
| 3,290,310 | 12/1966 | Morf | 210/54 C |
| 3,313,795 | 4/1967 | Rubin | 260/112 R |
| 3,484,837 | 12/1969 | Odom | 210/52 |
| 3,498,913 | 3/1970 | Sellet | 210/54 C |
| 3,767,046 | 10/1973 | Hartkorn | 204/149 |
| 3,835,041 | 9/1974 | Grant | 210/27 |
| 3,897,333 | 7/1975 | Field | 210/54 C |
| 3,957,904 | 5/1976 | Isaoka | 210/51 |
| 3,960,648 | 6/1976 | Nakajima | 210/53 |
| 3,969,203 | 7/1976 | Ramirez | 204/152 |
| 4,013,555 | 3/1977 | Davis | 210/53 |
| 4,025,249 | 5/1977 | Neuschutz | 210/52 |
| 4,025,428 | 5/1977 | Wegmuller | 210/502 |

FOREIGN PATENT DOCUMENTS

| | | |
|---|---|---|
| 2189327 | 6/1972 | France . |
| 2126234 | 6/1973 | France . |
| 1080383 | 7/1964 | United Kingdom ............ 210/54 |
| 1373034 | 1/1972 | United Kingdom . |
| 1302167 | 1/1973 | United Kingdom . |
| 1342269 | 1/1974 | United Kingdom . |
| 1357828 | 6/1974 | United Kingdom . |
| 1359932 | 7/1974 | United Kingdom . |
| 1401819 | 7/1975 | United Kingdom . |

*Primary Examiner*—Ernest G. Therkorn
*Attorney, Agent, or Firm*—Edward McC. Roberts; John P. Spitals; Michael W. Glynn

[57] ABSTRACT

A process for purifying effluents which contain proteins, which process comprises treating said effluents with a basic polymer compound and separating the flocks that are formed from the effluent.

9 Claims, No Drawings

PROCESS FOR PURIFYING EFFLUENTS CONTAINING PROTEINS

This is a continuation of application Ser. No. 012,673 filed on Feb. 15, 1979, which is a continuation of application Ser. No. 808,763 filed June 22, 1977, both now abandoned.

The present invention provides a process for treating effluents which contain proteins. The process consists in treating the effluents with a basic nitrogen-containing polymer compound and separating the flocks which have formed from the effluent.

Sources of waste water effluents which contain proteins are for example gelatin factories, photographic plants, breweries, malt-houses, leather factories and also abatteirs. The proteins can be in dissolved form or in the form of colloidal or suspended particles. Proteins which can be removed from effluents in accordance with the invention are in particular seleroproteins, such as gelatin or gelatin-like products which are obtained by the hydrolytic extraction of collagen which is obtained from the bones, skins and fibrous tissues of animals, as well as fish glues and protamines, such as salmine and clupene, which are obtained from fish bones and cartilages.

These polymers can be present as such or also in chemically modified form.

Suitable basic nitrogen-containing polymer compounds which can be used according to the invention are principally polymers which contain basic nitrogen atoms which are capable of salt-formation.

Suitable polymers are water-soluble or dispersable basic aminoplasts, for example formaldehyde-dicyandiamide condensation products. Preferably the process is carried out with condensation products of formaldehyde, dicyandiamide and one or more of the following components: urea, ammonium chloride and alkylenepolyamine containing, for example, altogether 2 to 18, preferably 2 to 8, carbon atoms and 2 to 5 amino groups.

The alkylenepolyamines are, for example, ethylenediamine, propylenediamine, butylenediamine, pentylenediamine, hexamethylenediamine, diethylenetriamine, triethylenetriamine, 1,2-propylenediamine, dipropylenetriamine, tripropylenetetramine, dihydroxydipropylenetriamine, dibutylenetriamine, tributylenetriamine, tetrabutylenepentamine, dipentylenetriamine, tripentylenetetramine, tetrapentylenepentamine, dihexamethylenetriamine, trihexamethylenetetramine and tetrahexamethylenepentamine.

Particularly suitable basic aminoplasts are in particular formaldehyde-dicyandiamide, formaldehyde-dicyandiamide-ethylenediamine or formaldehyde-urea-dicyandiamide condensation products. Preferred products are obtained for example by condensation of formaldehyde, dicyandiamide and ammonium chloride or by condensation of formaldehyde with the reaction product of dicyandiamide with ethylenediamine or the corresponding acid salt, such as the hydrochloride or ammonium chloride. Further basic aminoplasts are obtained by condensation of urea, dicyandiamide and formaldehyde in the presence of acid e.g. hydrochloric acid, or by condensation of dicyandiamide with formaldehyde and the tetrahydrochloride of triethylenetetramine.

Preferably the basic aminoplasts are condensation products obtained from 1.8 to 2.5 moles of formaldehyde, 0.5 to 1.2 moles of dicyandiamide and 0.5 to 1 mole of ammonium chloride. If desired, 0.1 to 1.5 moles of ethylenediamine can additionally be used.

It is likewise possible to use as basic polymers reaction products of halohydrins or dihalohydrins with alkylene- or polyalkylenepolyamines or alkylene- or polyalkylenepolyimines, for example reaction products of epichlorohydrin with diethylenetriamine, dipropylenetriamine or triethylenetetramine or with polyethylenimines. Such basic reaction products are described, for example, in DAS 1,010,736.

Suitable basic, nitrogen-containing polymers are also soluble basic polymers which are manufactured by condensation of dibasic carboxylic acids of 2 to 10 carbon atoms, e.g. adipic acid or the functional derivatives thereof, for example esters, amides or anhydrides, with polyamines, especially with polyalkylenepolyamines, and which are described, for example, in U.S. Pat. No. 2,882,185.

Especially preferred basic polymers, however, are also the polyamidepolyamines which are obtained by reaction of polymerised, preferably dimerised to trimerised, fatty acids with polyamines, advantageously in such a ratio that the resultant polyamide resin has an amino value in the range of about 200 to 650 mg of potassium hydroxide per gram of polyamidepolyamine.

These polyamidepolyamines can be used by themselves or in combination with the above mentioned formaldehyde condensation products.

The polymeric unsaturated fatty acids used herein are advantageously aliphatic, ethylenically unsaturated dimeric to trimeric fatty acids.

As polyamines which are suitable for obtaining the basic polyamides it is possible to use aromatic polyamines or especially the above mentioned aliphatic polyamines, in particular alkylenepolyamines. These polyamines can also contain heterocyclic structures, for example imidazolines.

Polymeric fatty acids which are advantageously present in such polyamides are obtained by polymerisation of one or more unsaturated long-chain aliphatic or aromatic-aliphatic acids or esters thereof or other derivatives that can be readily converted into the acid. Suitable examples of such polymeric fatty acids are described in British Pat. Nos. 878,985 and 841,554.

Preferably, the polyamide-polyamines are manufactured from polyalkylenepolyamines and aliphatic, ethylenically unsaturated dimeric to trimeric acids which are derived from monocarboxylic acids with 16 to 22 carbon atoms. These monocarboxylic acids are fatty acids with at least one ethylenically unsaturated bond and preferably 2 to 5 such bonds. Examples of this class of acids are oleic acid, hiragonic acid, eleostearic acid, licanoic acid, arachidonic acid, clupadonic acid and especially linoleic and linolenic acid. These fatty acids can be obtained from natural oils in which they occur principally as glycerides.

The dimeric to trimeric linoleic or linolenic acids are particularly suitable. The industrial products of these acids contain as a rule 75 to 95 percent by weight of dimeric acids, 4 to 22 percent by weight of trimeric acids and 1 to 3 percent by weight of monomeric acid.

Further basic polymers are the polymers of an alkylenimine containing 2 to 4 carbon atoms which have an average molecular weight of 500 to 200,000 preferably 10,000 to 40,000. These polymers have normally a Brookfield viscosity at 20° C. of 500 to 20,000 centipoise. Particularly suitable alkylenimines are ethylenimine, propylenimine, 1,2-butylenimine and 2,3-butylenimine. The most preferred polyalkylenimine of all is polyethylenimine. Particularly preferred polyethylenimines are those which have an average molecular weight of 10,000 to 100,000, in particular 30,000 to 40,000.

Typical examples of the basic polymers to be used according to the invention are:

A. Condensation product of:
  1 mole of dicyandiamide
  2 moles of formaldehyde
  1 mole of ammonium chloride B. Condensation product of:
  2 to 2.2 moles of formaldehyde
  1 mole of dicyandiamide
  0.8 mole of ammonium chloride
  0.1 mole of ethylenediamine C. Condensation product of:
  3 to 4 moles of dicyandiamide
  7 moles of formaldehyde
  1 mole of the tetrahydrochloride of triethylenetetraamine D. Polyamidepolyamine from polymerised linoleic acid/linolenic acid and triethylenetetraamine with an amine value of 350 to 400 mg KOH/g.

The basic polymers used according to the invention can also be employed in combination with other flocculants, for example aluminium salts, such as aluminium sulphate or aluminium chlorides, iron salts, such as ferric or ferrous chlorides, ferric or ferrous sulphates as well as with polyacrylamides or copolymers of acrylic acid or acrylamide.

The treatment of the effluents with the basic polymer compound can be effected at any temperature, for example from 10° to 100° C. Preferably, however, the treatment is carried out at room temperature, i.e. at a temperature from approx. 10° to 35° C. If desired, the purification can also be effected under pressure or in vacuo. The pH value of the effluents can vary widely, for example between 2 and 12. However, depending on the nature of the polymer compound used as flocculant, pH corrections, for example to a value from 5 to 10, in particular 6 to 9, can ease or speed up the purification process.

The agent used according to the invention for removing proteins can be added to the effluent to be treated in any form. Preferably it is added in aqueous solution. Advantageously, the basic polymer compound is used in concentrations of 2 to 10 g, preferably from 3 to 6 g, per liter of effluent.

The protein concentration of the effluents can vary widely, for example from 100 to 10,000 mg/l. Typical concentrations are between 200 and 5000 mg/l. Such a concentration corresponds to a $BOD_5$ value of 400 to 6000 oxygen/liter of effluent ($BOD_5$ value = biochemical oxygen demand of the "Deutsche Einheitswerte zur Wasser-Abwasser-Schlammaufbereitung", 3rd edition).

The addition of the basic polymer compound can be effected by conventional methods. In many cases a thorough mixing of the mixture of effluent sludge and flocculant is necessary in order to effect the flocculation. Afterwards, the separation of the deposited sludge from the purified water can be accomplished for example by sedimentation, flotation, centrifuging and subsequent filtration or by direct filtration. This separation can optionally be carried out under pressure.

In a particular embodiment of the process of the invention, the agglomeration of the proteins in the effluents can additionally be achieved by means of an electrolysis process. In this process, the effluents treated with the basic polymer compound are conducted into an electrolytic cell and the sludge agglomerates are formed by the action of an electric current. These agglomerates can then be easily removed from the clarified effluent.

The electrolytic cell, which advantageously assumes the function of the cathode, can be made of any electrically conductive material. Copper, iron, nickel or stainless steel are especially preferred. On the other hand, the anode can be made of materials that do not melt when a current is applied. Aluminium, carbon, graphite, lead dioxide, zinc, platinum and the like can be used. It is particularly advantageous if the anode is made of aluminium or an aluminium alloy. These electrodes can be in the form of plates, rods, particles and filaments and there is no restriction as regards the form. Plate-shaped electrodes, which stand adjacent to one another, are used for preference. So-called reactive or sacrificial anodes (loss anodes) are preferred. The electrolysis is advantageously carried out at 1 to 10 $amp/dm^2$, preferably at 5 to 6 $amp/dm^2$.

The rate of flow of the effluent flowing into the electrolytic cell is approx. 200 to 3000 liters per hour. Its determination is normally dependent on the concentration of the proteins in the effluent. If necessary, the effluent can be conducted through several electrolyte cells which are connected in parallel.

The electrolysis can advantageously be carried out while stirring the solution. The stirring can be effected for example by blowing an inert gas into the effluent, by mechanical stirring using the turbulence of the flowing water or a rotatable anode, or by electric stirring.

To speed up the electroflocculation, those carrier electrolytes which are used in the field of electrochemistry, for example alkali metal ions, such as sodium or potassium ions or aluminium ions, can be added to the effluent in the electric cell.

According to the invention, 50 to 98% of the proteins originally present in the effluent can be removed by appropriate choice of the basic polymer. Whenever a sufficient removal of proteins proves unsuccessful, it is advisable to repeat the purification procedure.

The flocculent material which is formed from the added agent and the proteins present in the effluent normally sinks or precipitates or is carried to the surface, i.e. made floatable, by blowing in inert has or as a result of the gas evolution-a secondary reaction caused by the electrolysis. On account of the colloidal character, the flocks tend to sink with other solids present in the system. Owing to the strongly flocculating properties of the basic polymer used, the effluents can also be decolourised. The process of the invention therefore also has the advantage of being able to diminish the content of other impurities in the effluent.

In the following Examples the parts and percentages are by weight.

EXAMPLE 1

The effluents of a gelatin factory, which have a $BOD_5$ value in the region of 600 mg $O_2/l$ and a pH of >10, are adjusted with sulphuric acid to pH 8 and treated with 3 g per liter of condensation product A. The effluents are then conducted through an electrolyte cell the anode of which consists of aluminium and the cathode of iron. The amount of current to be applied is 5 $amp/cm^2$ of anode surface. The electrolysis causes the sludge which is formed to float to the surface of the water, there it is removed by a mechanical separator. After separation of the sludge/water mixture, the purified effluent has a BOD$_5$ value of only 10 mg O$_2$/l.

Similarly good results are obtained by using the same amount of the one of the products B, C and especially D instead of the condensation product A.

EXAMPLE 2

The effluents of a plant for manufacturing light-sensitive materials based on silver halide-gelatin emulsions have a silver content in the region of 1600 ppm and are strongly discoloured by dyestuff additives.

The pH value of these effluents is adjusted firstly with sodium hydroxide solution to 8–8.5. The effluents are afterwards mixed, per m$^3$, with 3.6 liters of a 60% aqueous solution of the condensation product A used in Example 1 and immediately thereafter phase separated in a centrifugal decanter. A silver-containing sludge phase with 12.3% of residual dye constituents and a clear, colourless, aqueous phase are obtained, whose residual silver content is about 0.1 ppm and whose BOD$_5$ is below 20 mg O$_2$/l.

Similarly good results are obtained by using the same amount of one of the products B, C and D instead of condensation product A.

EXAMPLE 3

The malodorous, blood-red effluents of an abattoir are adjusted with sodium hydroxide solution to pH 8 and then treated with 4 g per liter of condensation product A. A good flocculation is obtained by bringing Al$^{+++}$ions into solution by means of an aluminium loss anode. The electrical energy to be applied in this case is 10 kwh per m$^3$ of effluent. The sludge agglomerates formed as a result of this electrolytic process are caused to float, and the floatng scum is removed by a surface separator, leaving a colourless and virtually odourless effluent whose BOD$_5$ is less than 25 mg O$_2$/l and which can therefore be conveyed to a drainage canal.

Similarly good results are obtained by using one of the products B, C and especially D instead of condensation product A.

What we claim is:

1. A process for purifying effluents containing proteins which process comprises treating said effluent with a basic water-soluble aminoplast flocculant which is a formaldehyde-dicyandiamide condensation product, to flocculate said proteins, agglomerating the resulting flocculated proteins by electrolysis in the presence of a sacrificial aluminum or aluminum alloy anode and an electrically conductive cathode, and removing the resulting agglomerated and flocculated proteins from said effluent.

2. A process according to claim 1, wherein the basic polymer is a condensation product of formaldehyde, dicyandiamide and one or more of the components consisting of urea, alkylenepolyamine and ammonium chloride.

3. A process according to claim 1, wherein the basic polymer is a condensation product of formaldehyde, dicyandiamide and ammonium chloride.

4. A process according to claim 1, wherein the basic polymer is a condensation product of formaldehyde, dicyandiamide, ethylenediamine and ammonium chloride.

5. A process according to claim 1, wherein the effluents are treated at a pH value of 5 to 10.

6. A process according to claim 1, wherein the effluents are treated at a pH value of 6 to 9.

7. A process according to claim 1, wherein the basic polymer is used in a concentration of 2 to 10 g per liter of effluent.

8. A process according to claim 1, wherein the basic polymer compound is used in a concentration of 3 to 6 g per liter of effluent.

9. A process according to claim 1, wherein the electrodes consist of an anode of aluminium or an aluminium alloy and of a cathode of iron, copper, nickel or stainless steel.

* * * * *